US007023153B2

(12) United States Patent
Kitazawa

(10) Patent No.: US 7,023,153 B2
(45) Date of Patent: Apr. 4, 2006

(54) MOTOR CONTROL DEVICE

(75) Inventor: Takashi Kitazawa, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 10/518,048

(22) PCT Filed: May 23, 2003

(86) PCT No.: PCT/JP03/06480

§ 371 (c)(1),
(2), (4) Date: Dec. 16, 2004

(87) PCT Pub. No.: WO04/001946

PCT Pub. Date: Dec. 31, 2003

(65) Prior Publication Data

US 2005/0218847 A1 Oct. 6, 2005

(30) Foreign Application Priority Data

Jun. 19, 2002 (JP) ............................ 2002-178403

(51) Int. Cl.
*G05B 11/36* (2006.01)

(52) U.S. Cl. ...................................... 318/162; 318/567

(58) Field of Classification Search ........ 318/162–164, 318/567; 388/904
See application file for complete search history.

(56) References Cited

U.S. PATENT DOCUMENTS

| | | | | |
|---|---|---|---|---|
| 3,785,463 | A * | 1/1974 | Kuhl et al. | 187/295 |
| 4,434,874 | A * | 3/1984 | Caputo | 187/293 |
| 4,470,482 | A * | 9/1984 | Husson | 187/295 |
| 4,689,540 | A * | 8/1987 | Tani et al. | 318/608 |
| 5,574,351 | A | 11/1996 | Jacobson et al. | |
| 5,686,707 | A * | 11/1997 | Iijima | 187/291 |

FOREIGN PATENT DOCUMENTS

| | | | |
|---|---|---|---|
| JP | 5-324304 | A | 12/1993 |
| JP | 2950149 | A | 9/1999 |
| JP | 2001-352773 | A | 12/2001 |

* cited by examiner

*Primary Examiner*—Bentsu Ro
(74) *Attorney, Agent, or Firm*—Sughrue Mion, PLLC

(57) ABSTRACT

It is an object of the invention to regulate a control gain without requiring a host controller.

In the invention, a command pattern generating section (14) generates a basic operation pattern for operating a motor based on various parameters such as a movement distance Pd, a maximum speed Vx, an acceleration time Ta, a deceleration time Td, a waiting time T, a forward rotating repetition number n, a reverse rotating repetition number m and a forward and reverse rotating repetition number y which are input through a parameter input device (11), and repeats the basic operation pattern at a set number of times to set a continuous run pattern, and generates and outputs a position command for continuously operating the motor based on the continuous run pattern. Accordingly, it is possible to continuously generate a driving command for operating the motor without requiring a host controller (12), thereby regulating a control gain.

2 Claims, 3 Drawing Sheets

MOTOR CONTROL DEVICE

TECHNICAL FIELD

The present invention relates to a motor control apparatus for controlling the driving operation of a motor.

BACKGROUND ART

In order to enhance the responsiveness of a motor control apparatus to shorten a positioning time, it is necessary to regulate the set values of a control gain such as a speed loop gain (Kv), a speed loop integral time constant (Ti) or a position loop gain (Kp) of the motor control apparatus, and a torque command filter. In order to regulate these set values to be optimum, however, it is necessary to carry out the regulation during the operation of the motor in a state in which the motor and a machine are combined with each other. In a conventional motor control apparatus therefor, an analog command or a pulse train command is input as a driving command from an host controller to the motor control apparatus and the torque command of the motor control apparatus or a monitor signal indicative of a position deviation is observed by an external measuring device, and at the same time, regulates the control gain while the motor is operated based on the input command value.

For this reason, the host controller is always required for regulating the control gain in such a conventional motor control apparatus. However, the control gain is often set during a test run to be carried out before an actual forward run. In the case in which the host controller is not attached to a machine for a while after the motor control apparatus is incorporated in the machine, the control gain of the motor control apparatus cannot be regulated until the operations of all electrical products can be confirmed forwardly. Consequently, a working efficiency is low in the test run.

Moreover, many motor control apparatuses have a jog run function capable of manually setting a driving command and can confirm a motor run even if the host controller is not provided as described in Japanese Patent No. 2950149 publication and JP-A-5-324304 publication. However, an input device such as an operator device is to be always operated in order to use the jog run function, and the rotating direction and moving range of a motor can be confirmed. However, the motor control apparatus has physical restrictions on the input device. In many cases, therefore, an input operation for regulating a gain and the operation of the jog run cannot be carried out at the same time.

In the conventional motor control apparatus, there is a problem in that the control gain cannot be regulated if the host controller for generating a driving command is not provided.

It is an object of the invention to provide a motor control apparatus capable of regulating a control gain without requiring the host controller.

DISCLOSURE OF THE INVENTION

In order to attain the object, the invention provides a motor control apparatus for controlling a driving operation of a motor by outputting a torque command, comprising:

command pattern generating means for generating a basic operation pattern for operating the motor based on an input parameter, repeating the basic operation pattern at a set number of times to set a continuous run pattern, and generating a position command for continuously operating the motor based on the continuous run pattern;

position control means for generating a speed command based on the position command generated by the command pattern generating means; and speed control means for generating a torque command for driving the motor based on the speed command sent from the position control means.

Moreover, the command pattern generating means generates a basic operation pattern based on a movement distance Pd, a maximum speed Vx, an acceleration time Ta and a deceleration time Td in the input parameter and repeats the basic operation pattern at a repetitive number of times every waiting time T, thereby setting a continuous run pattern.

According to the invention, the basic operation pattern of the run is set by inputting the parameter and the continuous run to be carried out by the repetition of the basic operation pattern is selected depending on the parameter. Consequently, it is possible to continuously generate a driving command in the motor control apparatus without requiring the host controller. Therefore, it is possible to regulate a control gain and a torque command filter without requiring the host controller for generating the driving command.

Figure 1:
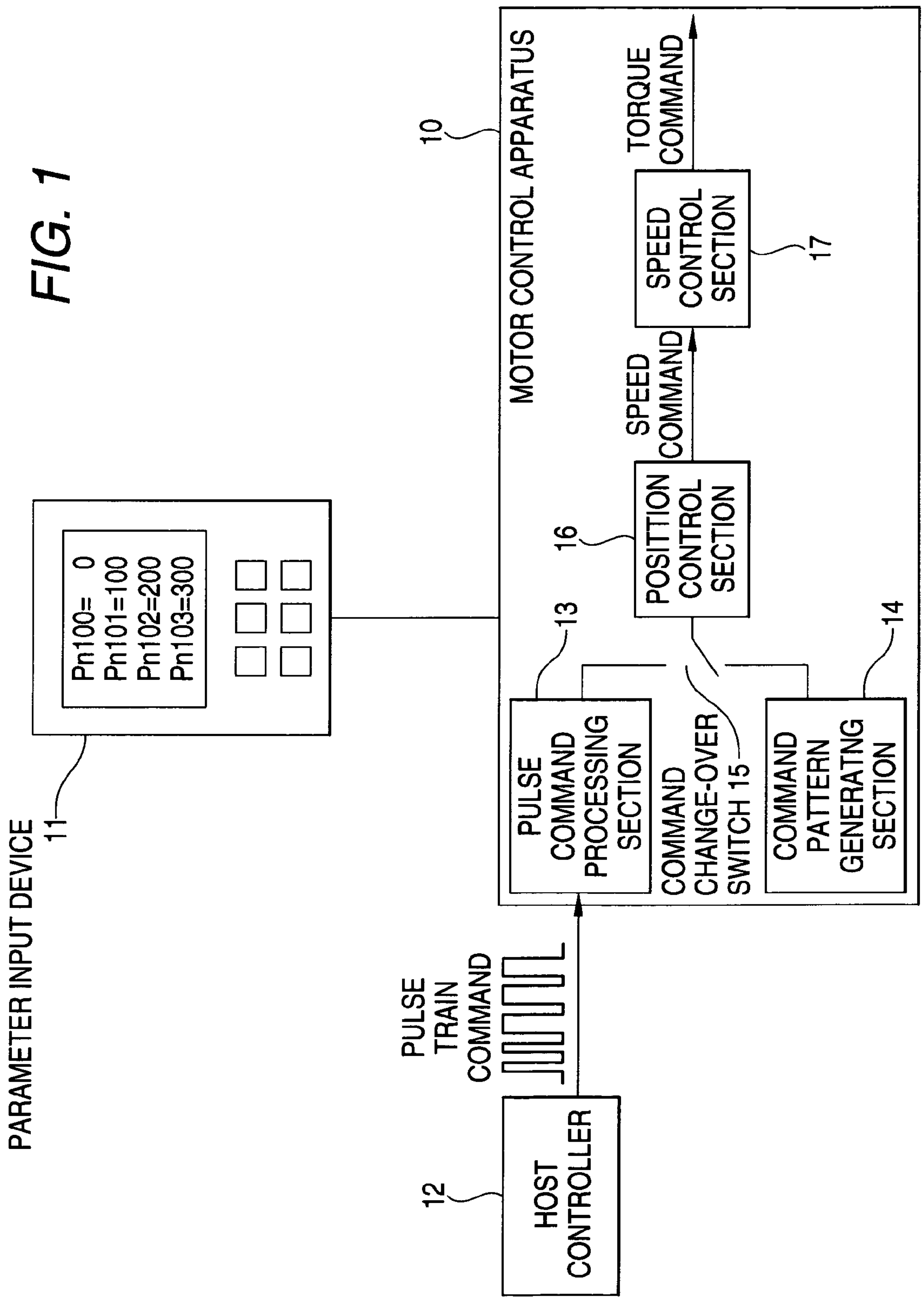
FIG. 1 is a block diagram showing the structure of a motor control apparatus according to an embodiment of the invention.

In the drawings, 10 denotes a motor control apparatus, 11 denotes a parameter input device, 12 denotes an host controller, 13 denotes a pulse command processing section, 14 denotes a command pattern generating section, 15 denotes a command change-over switch, 16 denotes a position control section, and 17 denotes a speed control section.

BEST MODE FOR CARRYING OUT THE INVENTION

Next, an embodiment of the invention will be described in detail with reference to the drawings.

FIG. 1 is a block diagram showing the structure of a motor control apparatus 10 according to an embodiment of the invention.

A host controller 12 outputs a pulse train command as a driving command to the motor control apparatus 10. The driving command is input from the host controller 12 to the motor control apparatus 10 according to the embodiment as shown in FIG. 1, and the motor control apparatus 10 generates and outputs a torque command for controlling the driving operation of a motor based on the input driving command during a forward run.

A parameter input device 11 inputs various parameters such as a movement distance Pd, a maximum speed Vx, an acceleration time Ta, a deceleration time Td, a waiting time T, a forward rotating repetition number n, a reverse rotating repetition number m and a forward and reverse rotating repetition number y.

The motor control apparatus 10 according to the embodiment is constituted by a pulse command processing section 13, a command pattern generating section 14, a command change-over switch 15, a position control section 16 and a speed control section 17 as shown in FIG. 1.

The pulse command processing section 13 converts a pulse train command sent from the host controller 12 into a position command. The command pattern generating section 14 generates a basic operation pattern for operating a motor based on various parameters input through the parameter input device 11, repeats the basic operation pattern at a set number of times to set a continuous run pattern, and generates and outputs a position command for continuously operating the motor based on the continuous run pattern. The command change-over switch 15 selects a position command sent from the pulse command processing section 13 and outputs the position command to the position control section 16 in case of a forward run, and selects a position command generated by the command pattern generating section 14 and outputs the position command to the position control section 16 in the case in which a control gain is to be regulated during a test run. The position control section 16 generates a speed command based on the position command input through the change-over switch 15. The speed control section 17 generates a torque command for driving the motor based on the speed command sent from the position control section 16.

Description will be given to a specific example in which a command pattern capable of continuously driving the motor by a position control is generated based on various parameters such as the movement distance Pd, the maximum speed Vx, the acceleration time Ta, the deceleration time Td and the waiting time T which are input from the parameter input device 11.

Figure 2:
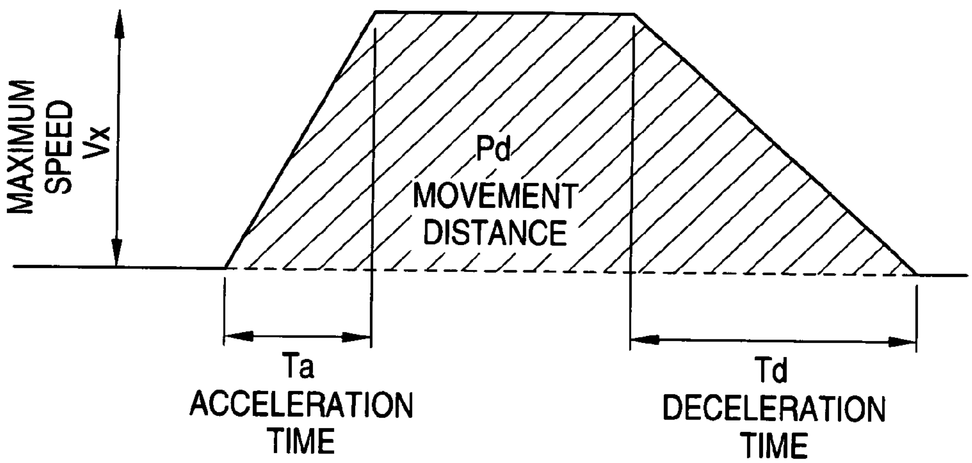
FIG. 2 is a diagram showing a basic operation pattern P1 in a forward rotating direction in the motor control apparatus according to the embodiment of the invention.
Figure 3:
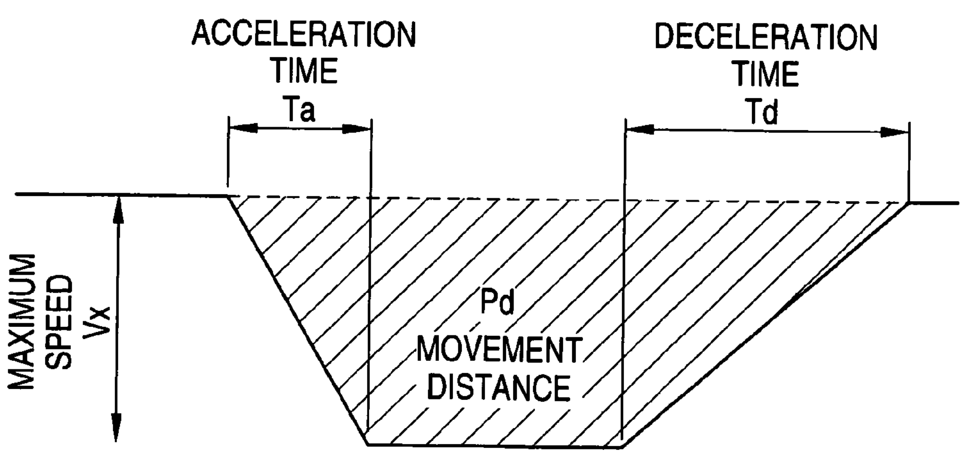
FIG. 3 is a diagram showing a basic operation pattern P2 in a reverse rotating direction in the motor control apparatus according to the embodiment of the invention.
Figure 4:
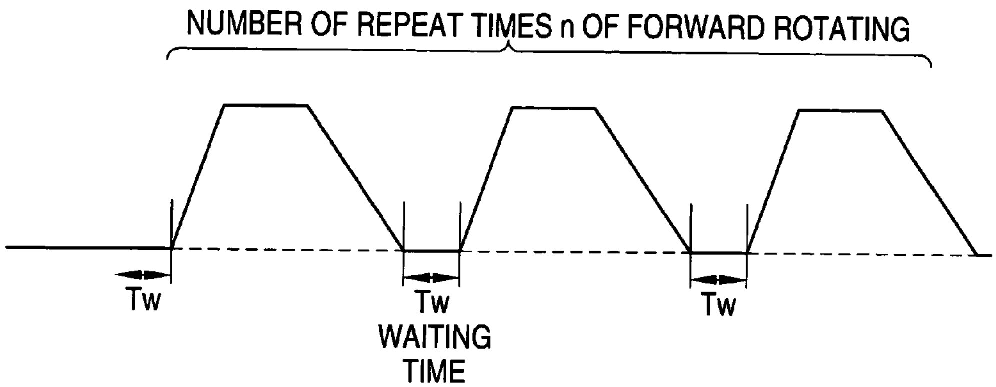
FIG. 4 is a diagram showing a continuous operation pattern P1*n* in a forward rotating direction in the motor control apparatus according to the embodiment of the invention.
Figure 5:
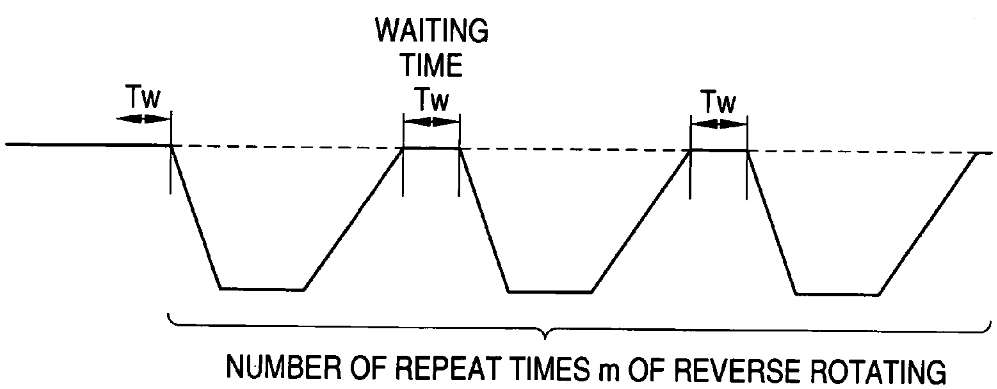
FIG. 5 is a diagram showing a continuous operation pattern P2*m* in a reverse rotating direction in the motor control apparatus according to the embodiment of the invention.
Figure 6:
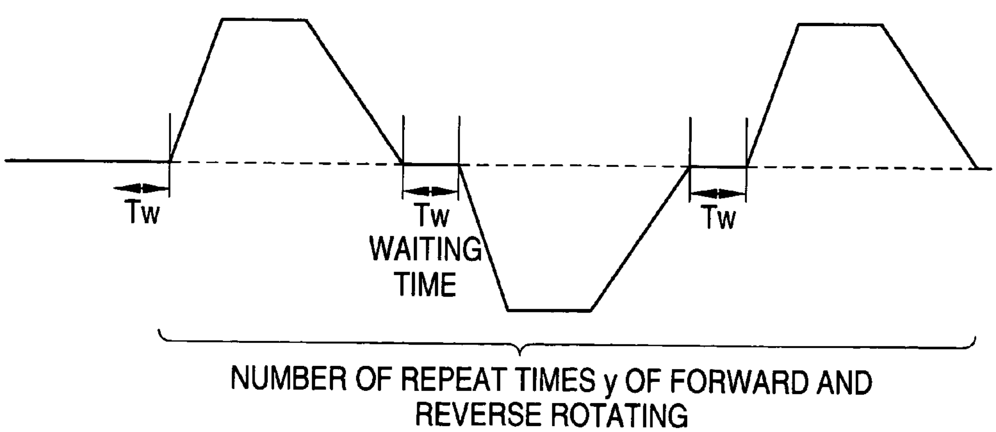
FIG. 6 is a diagram showing a continuous operation pattern P12*y* in forward and reverse rotating directions in the motor control apparatus according to the embodiment of the invention.

More specifically, the command pattern generating section 14 generates an operation pattern based on a movement distance Pd, a waiting time Tw, an acceleration time Ta and a deceleration time Td shown in FIG. 2 as a basic operation pattern P1 in a forward rotating direction and an operation pattern based on a movement distance Pd, a waiting time Tw, an acceleration time Ta and a deceleration time Td shown in FIG. 3 as a basic operation pattern P2 in a reverse rotating direction. Then, the command pattern generating section 14 sets, as continuous run patterns, a continuous run pattern P1*n* for running the basic operation pattern P1 at a repetition number n as shown in FIG. 4, a continuous run pattern P2*m* for running the operation pattern P2 at a repetition number m as shown in FIG. 5, and a continuous run pattern P2*y* for running the operation pattern P2 after the operation pattern P1 and carrying out this run at a repetition number y as shown in FIG. 6.

Thereafter, the command pattern generating section 14 generates a position command based on the continuous run patterns P1*n*, P2*m* and P2*y* and inputs the position command to the position control section 16 through the command change-over switch 15.

The basic operation pattern P1 and the basic operation pattern P2 described above are converted into a command pulse frequency specified by the movement distance Pd and the maximum speed Vx and the command pulse frequency is set to be a command value, and the command value is increased/decreased in sampling for each of the acceleration and deceleration times Ta and Td. Consequently, the basic operation patterns P1 and P2 having a trapezoidal wave or a triangular wave are created and the basic operation patterns P1 and P2 are executed at a set continuous time n, m or y. Thus, it is possible to easily generate a continuous driving command in place of a section to which the position command is input from the outside of the motor control apparatus.

As described above, according to the motor control apparatus in accordance with the embodiment, the parameter is input to set the basic operation pattern of the run and the continuous run to be carried out by the repetition of the basic operation pattern is selected based on the parameter. Thus, it is possible to continuously generate a driving command in the motor control apparatus 10 without requiring the host controller 12. Therefore, it is possible to regulate a control gain and a torque command filter without requiring the host controller 12 for generating the driving command.

While the description has been given on the assumption that the command pattern generating section 14 serves to set the patterns shown in FIGS. 4 to 6 to be the continuous run operation pattern in the motor control apparatus according to the embodiment described above, the invention is not restricted to such a case but the basic operation patterns shown in FIGS. 2 and 3 may be combined with each other to generate various continuous operation patterns.

While the invention has been described in detail with reference to the specific embodiment, it is apparent to the skilled in the art that various changes and modifications can be made without departing from the spirit and scope of the invention.

The application is based on Japanese Patent Application (JP-A-2002-178403) filed on Jun. 19, 2002 and contents thereof are incorporated by reference.

INDUSTEST APPLICABILITY

As described above, according to the invention, it is possible to continuously generate a driving command in a motor control apparatus by simply inputting a parameter to select an operation pattern. Therefore, it is possible to obtain such an advantage that the set values of a control gain and a torque command filter can be regulated without requiring an host controller.

The invention claimed is:

1. A motor control apparatus for controlling a driving operation of a motor by outputting a torque command, comprising:

command pattern generating means for generating a basic operation pattern for operating the motor based on an input parameter, repeating the basic operation pattern at a set number of times to set a continuous run pattern, and generating a position command for continuously operating the motor based on the continuous run pattern;

position control means for generating a speed command based on the position command generated by the command pattern generating means; and speed control means for generating a torque command for driving the motor based on the speed command sent from the position control means.

2. The motor control apparatus according to claim 1, wherein the command pattern generating means generates a basic operation pattern based on a movement distance Pd, a maximum speed Vx, an acceleration time Ta and a deceleration time Td in the input parameter and repeats the basic operation pattern at a repetitive number of times every waiting time T, thereby setting a continuous run pattern.

* * * * *